US011271866B2

(12) United States Patent
Kludy et al.

(10) Patent No.: US 11,271,866 B2
(45) Date of Patent: Mar. 8, 2022

(54) DATA SHARING EVENTS

(71) Applicant: Citrix Systems, Inc., Fort Lauderdale, FL (US)

(72) Inventors: Thomas Michael Kludy, Cooper City, FL (US); Alejandro Carrasquilla, Deerfield Beach, FL (US); Michael Paul Wehniainen, Redmond, WA (US); Ayush Jain, North Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/008,739

(22) Filed: Sep. 1, 2020

(65) Prior Publication Data

US 2020/0396173 A1    Dec. 17, 2020

Related U.S. Application Data

(63) Continuation of application No. 15/825,870, filed on Nov. 29, 2017, now Pat. No. 10,798,020.

(51) Int. Cl.
| | |
|---|---|
| *H04L 12/911* | (2013.01) |
| *G06F 9/54* | (2006.01) |
| *H04L 12/26* | (2006.01) |
| *G06F 16/27* | (2019.01) |
| *H04L 12/28* | (2006.01) |
| *G06F 16/25* | (2019.01) |
| *H04L 29/08* | (2006.01) |
| *H04L 47/70* | (2022.01) |
| *H04L 43/08* | (2022.01) |
| *H04L 67/141* | (2022.01) |

(52) U.S. Cl.
CPC .............. *H04L 47/82* (2013.01); *G06F 9/547* (2013.01); *G06F 16/25* (2019.01); *G06F 16/27* (2019.01); *H04L 12/2836* (2013.01); *H04L 43/08* (2013.01); *H04L 12/28* (2013.01); *H04L 67/141* (2013.01)

(58) Field of Classification Search
CPC .......... H04L 47/82; H04L 12/28; G06F 16/27
USPC ....................................................... 709/217
See application file for complete search history.

(56) References Cited

U.S. PATENT DOCUMENTS

| | | | |
|---|---|---|---|
| 6,697,849 B1 * | 2/2004 | Carlson | ..................... G06F 9/54 709/203 |
| 7,171,616 B1 | 1/2007 | Berstis | |
| 2011/0126185 A1 | 5/2011 | Waris et al. | |
| 2013/0246560 A1 | 9/2013 | Feng et al. | |
| 2017/0132270 A1 | 5/2017 | Ahmed et al. | |

(Continued)

*Primary Examiner* — Wing F Chan
*Assistant Examiner* — Leon Y Tseng
(74) *Attorney, Agent, or Firm* — Banner & Witcoff, Ltd.

(57) ABSTRACT

Methods and systems for sharing data among multiple services are described herein. Multiple services may access data from a shared data source. The services may subscribe to data sharing events. A data sharing service may iterate through the shared data source and transmit data retrieved from the shared data source in data sharing events. When the data sharing service reaches the end of the shared data source, the data sharing service may begin iterating through the shared data source again from the beginning. The data sharing events may be transmitted at a predetermined frequency. The services may subscribe to or unsubscribe from the data sharing events.

20 Claims, 6 Drawing Sheets

(56) References Cited

U.S. PATENT DOCUMENTS

2017/0163752 A1 6/2017 Kaledhonkar et al.
2019/0052700 A1 2/2019 Basra et al.

* cited by examiner

DATA SHARING EVENTS

CROSS-REFERENCE TO RELATED APPLICATION

This application is a continuation of, and claims priority to, U.S. application Ser. No. 15/825,870, filed Nov. 29, 2017, now allowed, which is incorporated herein fully by reference.

FIELD

Aspects described herein generally relate to computers, networking, hardware, and software. More specifically, one or more aspects of the disclosure relate to providing software services with shared data.

BACKGROUND

Multiple software services may each access a shared data source, such as one or more databases. Each of the software services may request to access all or a portion of the data stored in the shared data source. The software services may each query the shared data source for data, which may strain or overload the shared data source.

When a new software service is activated, the new software service may request to access all of the data in the shared data source. The new software service may maintain a local data source which comprises a copy of all or a portion of the data stored in the shared data source. Upon activation, the new software service may request to migrate all data from the shared data source to the local data source. This initial migration of data may overload the shared data source, particularly in instances where multiple software services are simultaneously performing this initial migration. It may be preferable to provide data from the shared data source to the multiple software services in a manner that does not overload the shared data source.

The multiple software services may update their respective local data sources in response to changes to the shared data source over time. The shared data source may provide information to the software services about updates to the shared data source, such as by providing change events to the multiple software services when the shared data source is modified. These updates or change events may be missed by a software service, such as due to a momentary outage or other failure. It may be preferable to notify the multiple software services of any changes or updates to the shared data source, or to allow the software services to verify their local data using the shared data source, in a manner that does not overload the shared data source.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for managing a shared data source and providing data sharing events.

In particular, one or more aspects of the disclosure provide ways of iteratively traversing a shared data source and creating data sharing events. The data sharing events may be transmitted to services that are subscribed to the data sharing events. The services may access data in the data sharing events and store the data in local data sources and/or perform other actions using the data in the data sharing events.

In some embodiments, a plurality of services subscribed to data sharing events may be determined. A data polling rate corresponding to a data source may be determined. A data transmission rate corresponding to the data sharing events may be determined. Data from the data source may be retrieved by iterating through the data source at the data polling rate. The data sharing events may be transmitted to each service of the plurality of services. The data sharing events may be transmitted based on the data transmission rate. The data sharing events may comprise the retrieved data from the data source.

The data sharing events may each comprise one row of data from the data source. The data sharing events may comprise one or more user identifiers. The data polling rate may indicate a maximum number of requests over a period of time. The data transmission rate may indicate a maximum number of data sharing events to be transmitted over a period of time. When an end of the data source has been reached, the iterating may be restarted at a beginning of the data source. Determining the plurality of services may comprise receiving a list of addresses corresponding to the plurality of services. The data polling rate and the data transmission rate may be adjusted based on a size of the data source. A request may be received, from a service, to subscribe to the data sharing events. The data source may comprise a shared data source accessed by each service of the plurality of services. The data source may be queried for the data.

In some embodiments, a request may be sent to subscribe to data sharing events. The request may correspond to a service. In response to the request, a plurality of data sharing events may be received. An indication of a user may be retrieved from a data sharing event of the plurality of data sharing events. The indication of the user may be stored in a local data source. The local data source may correspond to the service. Data corresponding to the user may be retrieved from a source external to the service. The data may be stored in the local data source.

The indication of the user may comprise a username. The local data source may be a database maintained by the service. The service may send the request using an application programming interface (API). Each data sharing event, of the plurality of data sharing events, may be received at a predetermined interval. An external database may be queried for the data corresponding to the user.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing shared data to multiple services. Multiple services may use data stored in a shared data source, such as a database. For example, the shared data source may comprise a listing of users authorized to access the services. A data sharing worker service may iterate through the shared data source, transmitting data sharing events to all of the services at a predetermined interval. The data sharing events may comprise a portion of the shared data source, such as a row of data. The data sharing service may iterate continuously through the shared data source, such that once the data sharing service reaches the end of the shared data source, the data sharing service may restart at the beginning of the shared data source. If a new service is implemented, the new service may request to subscribe to the data sharing events from the data sharing service. The new service may then begin receiving data sharing events.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
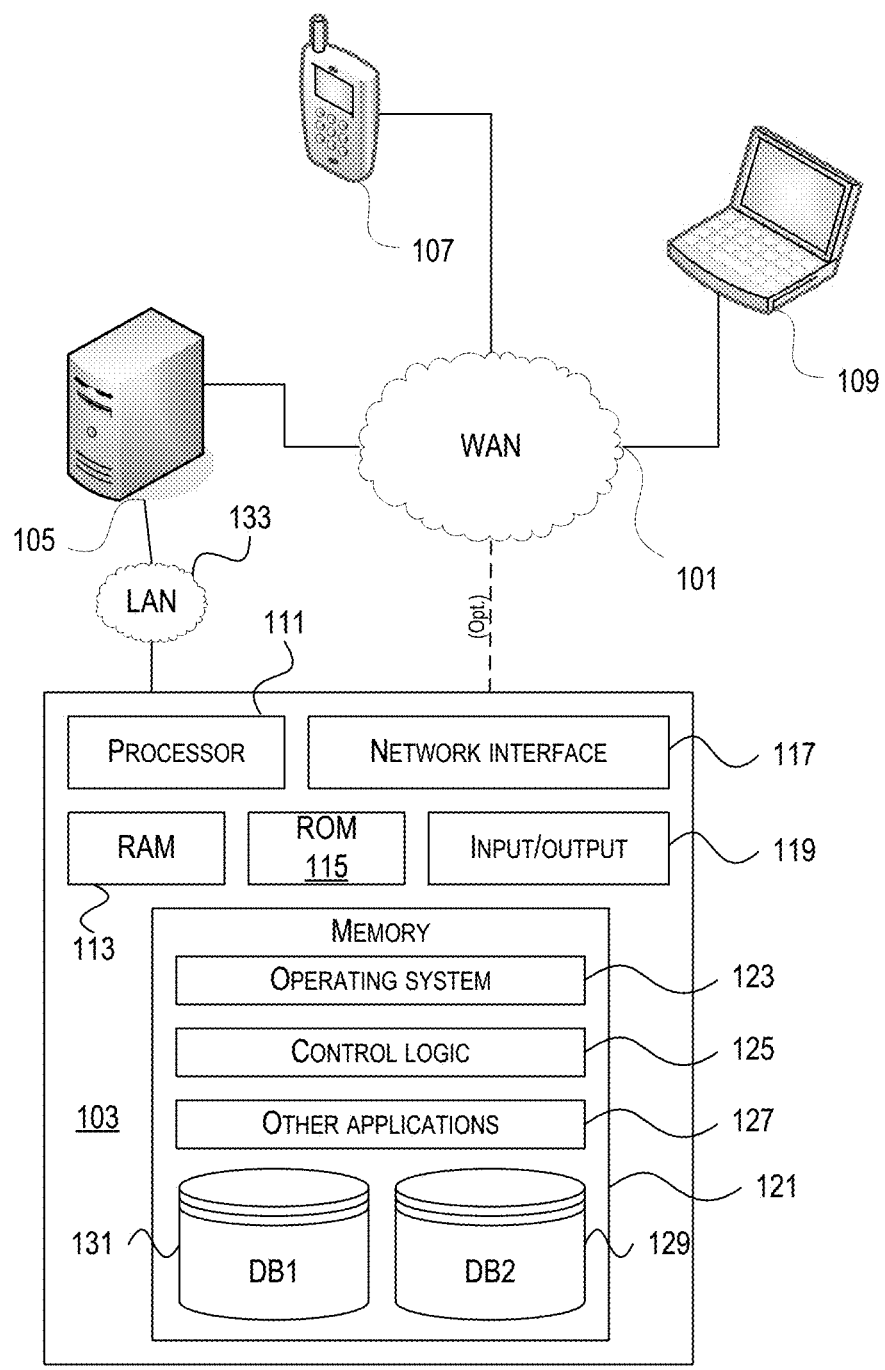
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 may provide overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 131 and a second database 129. In some embodiments, the first database 131 may include the second database 129 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
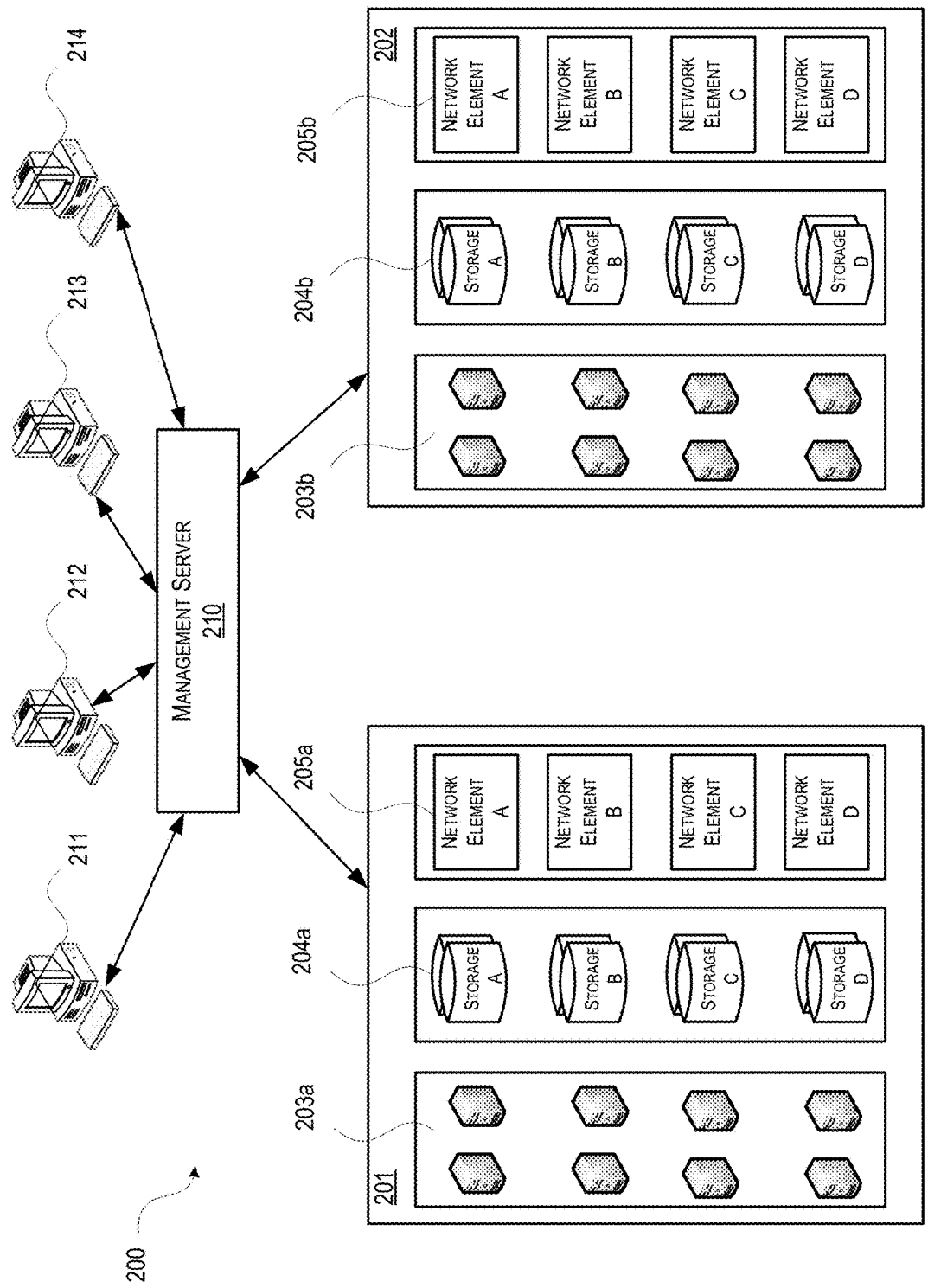
FIG. 2 depicts an illustrative cloud-based system architecture that may be used in accordance with one or more illustrative aspects described herein.

With further reference to FIG. 2, some aspects described herein may be implemented in a cloud-based environment. FIG. 2 illustrates an example of a cloud computing environment (or cloud system) 200. As seen in FIG. 2, client computers 211-14 may communicate with a cloud management server 210 to access the computing resources (e.g., host servers 203a-203b (generally referred herein as "host servers 203"), storage resources 204a-204b (generally referred herein as "storage resources 204"), and network resources 205a-205b (generally referred herein as "network resources 205")) of the cloud system.

Management server 210 may be implemented on one or more physical servers. The management server 210 may run, for example, CLOUDPLATFORM by Citrix Systems, Inc. of Ft. Lauderdale, Fla., or OPENSTACK, among others. Management server 210 may manage various computing resources, including cloud hardware and software resources, for example, host computers 203, data storage devices 204, and networking devices 205. The cloud hardware and software resources may include private and/or public components. For example, a cloud may be configured as a private cloud to be used by one or more particular customers or client computers 211-14 and/or over a private network. In other embodiments, public clouds or hybrid public-private clouds may be used by other customers over an open or hybrid networks.

Management server 210 may be configured to provide user interfaces through which cloud operators and cloud customers may interact with the cloud system 200. For example, the management server 210 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 210 also may include a set of APIs and/or one or more customer console applications with user interfaces configured to receive cloud computing requests from end users via client computers 211-14, for example, requests to create, modify, or destroy virtual machines within the cloud. Client computers 211-14 may connect to management server 210 via the Internet or some other communication network, and may request access to one or more of the computing resources managed by management server 210. In response to client requests, the management server 210 may include a resource manager configured to select and provision physical resources in the hardware layer of the cloud system based on the client requests. For example, the management server 210 and additional components of the cloud system may be configured to provision, create, and manage virtual machines and their operating environments (e.g., hypervisors, storage resources, services offered by the network elements, etc.) for customers at client computers 211-14, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 211-14 may be related, for example, different client computers creating virtual machines on behalf of the same end user, or different users affiliated with the same company or organization. In other examples, certain clients 211-14 may be unrelated, such as users affiliated with different companies or organizations. For unrelated clients, information on the virtual machines or storage of any one user may be hidden from other users.

Referring now to the physical hardware layer of a cloud computing environment, availability zones 201-02 (or zones) may refer to a collocated set of physical computing resources. Zones may be geographically separated from other zones in the overall cloud of computing resources. For example, zone 201 may be a first cloud datacenter located in California, and zone 202 may be a second cloud datacenter located in Florida. Management server 210 may be located at one of the availability zones, or at a separate location. Each zone may include an internal network that interfaces with devices that are outside of the zone, such as the management server 210, through a gateway. End users of the cloud (e.g., clients 211-14) might or might not be aware of the distinctions between zones. For example, an end user may request the creation of a virtual machine having a specified amount of memory, processing power, and network capabilities. The management server 210 may respond to the user's request and may allocate the resources to create the virtual machine without the user knowing whether the virtual machine was created using resources from zone 201 or zone 202. In other examples, the cloud system may allow end users to request that virtual machines (or other cloud resources) are allocated in a specific zone or on specific resources 203-05 within a zone.

In this example, each zone 201-02 may comprise an arrangement of various physical hardware components (or computing resources) 203-05, for example, physical hosting resources (or processing resources), physical network resources, physical storage resources, switches, and additional hardware resources that may be used to provide cloud computing services to customers. The physical hosting resources in a cloud zone 201-02 may comprise one or more computer servers 203, such as the virtualization servers 301 described above, which may be configured to create and host virtual machine instances. The physical network resources in a cloud zone 201 or 202 may include one or more network elements 205 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 201-02 may comprise storage disks (e.g., solid state drives (SSDs), magnetic hard disks, etc.) and other storage devices.

The example cloud computing environment shown in FIG. 2 also may include a virtualization layer with additional hardware and/or software resources configured to create and manage virtual machines and provide other services to customers using the physical resources in the cloud. The virtualization layer may include hypervisors, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 203 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Iterative Data Sharing

Figure 3:
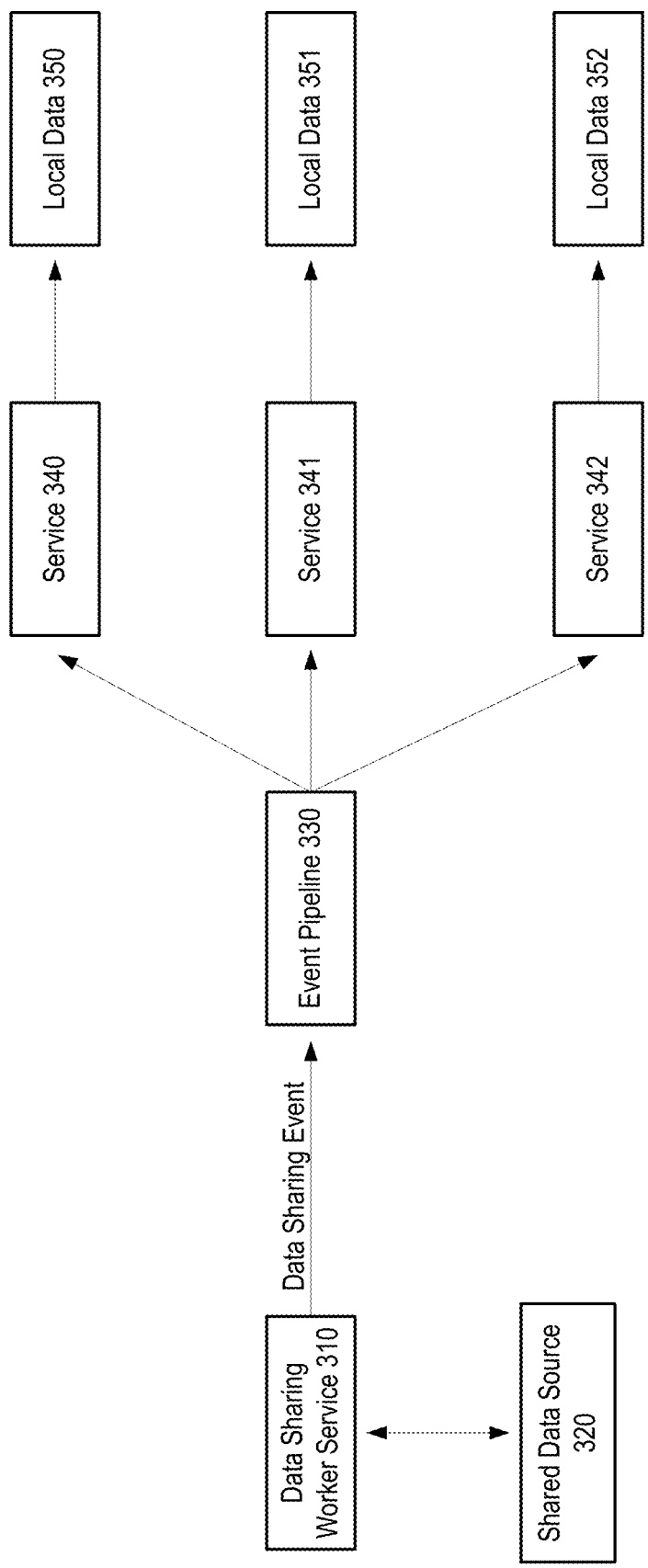
FIG. 3 is a diagram of a data sharing system according to one or more illustrative aspects of the disclosure.

FIG. 3 is a diagram of a data sharing system according to one or more illustrative aspects of the disclosure. Shared data source 320 may comprise data used by one or more services. Services 340-42 may be permitted to read from and/or write to the data source 320. The shared data source 320 may comprise one or more databases, or any other data storage system. For example, the shared data source 320 may comprise user identification for users subscribed to one or more of the services 340-42. The shared data source 320 may comprise both data that is and is not transmitted via data sharing events. For example, if the shared data source 320 is a database, the database may comprise one or more columns that are not transmitted in the data sharing events. In another example, the shared data source 320 may comprise multiple types of data, and a single type of data may be transmitted in data sharing events.

The services 340-42 may retrieve data from the shared data source 320 via data sharing events and/or directly. The services 340-42 may query the shared data source 320 for data. The services 340-42 may cause the shared data source 320 to store data, or modify data stored by the shared data source 320.

Data sharing worker service 310 may retrieve data from the shared data source 320 and periodically transmit data sharing events. The data sharing worker service 310 may comprise a stateless service. The data sharing worker service 310 may comprise one or more instances. The data sharing worker service 310 may query the shared data source 320 for data, and transmit the data as a data sharing event. The data sharing worker service 310 may poll the shared data source 320 at a data polling rate configured to prevent the shared data source 320 from becoming overloaded. The data polling rate may be adjusted based on measured performance values for the shared data source 320. For example, if the shared data source 320 is above a threshold amount of processor usage, the data polling rate may be reduced.

Each data sharing event may comprise data received from the shared data source 320. For example, if the shared data source 320 is a database, each data sharing event may comprise one row of data from the database, or one cell from the database. In another example, if the shared data source 320 stores user identification numbers, each data sharing event may comprise one user identification number. Data sharing events may be transmitted by the data sharing worker service 310 to an event pipeline 330. Although shown separately in FIG. 3, the data sharing worker service 310 may comprise the event pipeline 330.

The event pipeline 330 may transmit a data sharing event to all services subscribed to the data sharing system. In FIG. 3, the event pipeline 330 is illustrated as transmitting data sharing events to services 340-42. Each time the event pipeline 330 receives a data sharing event, that data sharing event may be transmitted to all of the services 340-42. Any number of services may receive data from the event pipeline 330. Services may be added to or removed from the list of services that event pipeline 330 transmits data sharing events to. A service may be added or removed from the event pipeline 330 at any time.

Although data sharing events are described as being transmitted to service 340-42, in some embodiments the services 340-42 may retrieve the data sharing events. For example, the services 340-42 may retrieve the data sharing events from a predetermined address.

Services 340-42 may comprise services that access data stored in the shared data source 320. The services 340-42 may each maintain their own respective local data 350-52. For example, local data 351 may comprise a database maintained by service 341. The local data 350-52 may comprise a copy of all or a portion of the data stored in the shared data source 320. Upon receiving a data sharing event via the event pipeline 330, the services 340-42 may update their respective local data 350-52 and/or perform other actions based on the data sharing event. For example, if the shared data source 320 comprises a catalog of domain names, upon receiving a data sharing event comprising a domain name, the service 342 may store the domain name in its local data 352 and access a server corresponding to the domain name to retrieve a web page. In another example, if the data sharing event comprises information describing a product, the service 340 may store the received information in the local data 350, and may access an external database to retrieve a photograph corresponding to the product.

Figure 4:
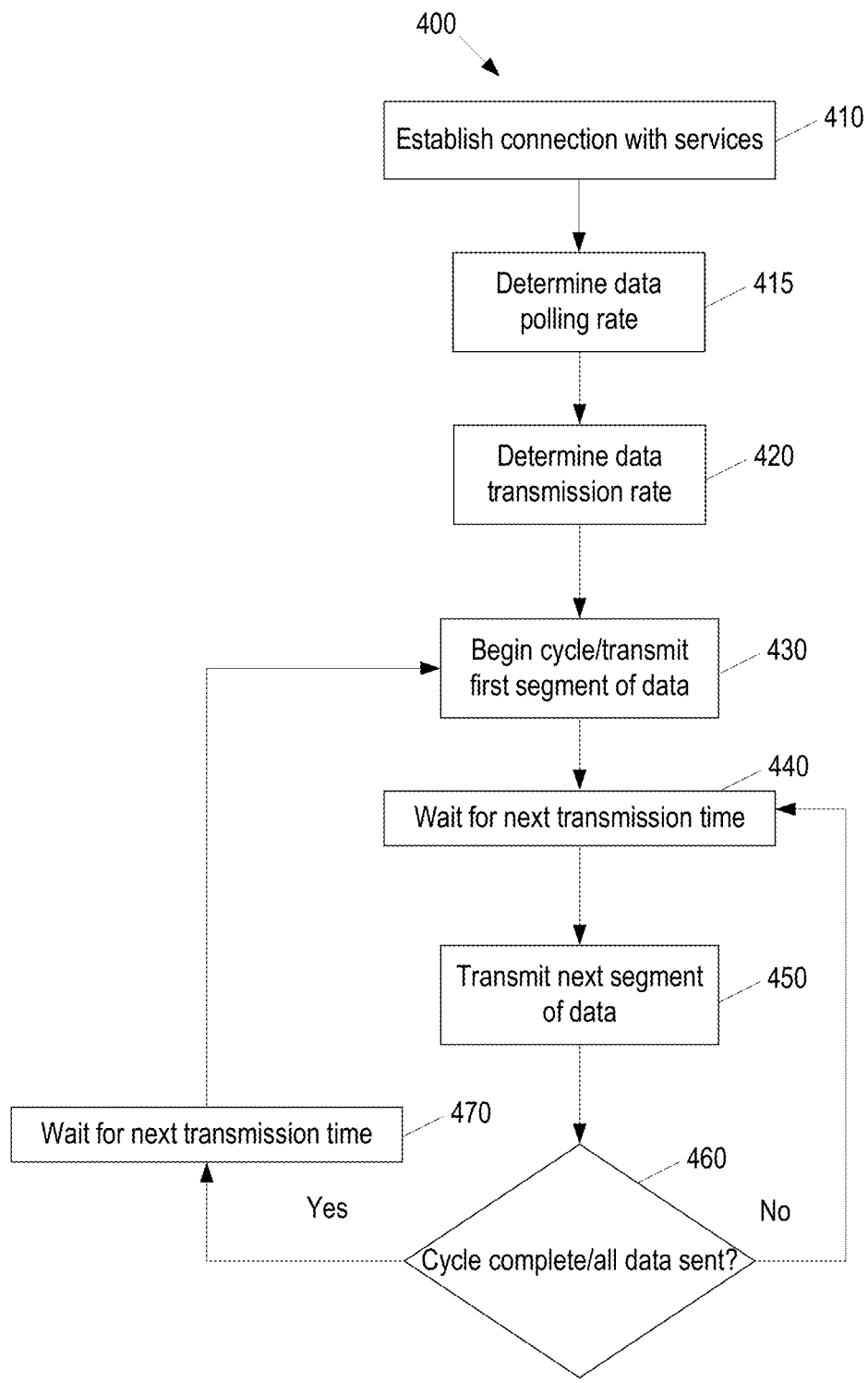
FIG. 4 is a flow diagram of a method for sharing data according to one or more illustrative aspects of the disclosure.

FIG. 4 is a flow diagram of a method 400 for sharing data according to one or more illustrative aspects of the disclosure. In one or more embodiments, one or more steps illustrated in FIG. 4 may be performed by one or more computing devices or entities. For example, portions of the steps illustrated in FIG. 4 may be performed by one or more computing devices, such as data server 103, web server 105, client computer 107, client computer 109, or by one or more elements of the cloud computing environment 200. The steps illustrated in FIG. 4 may be embodied in computer-executable instructions that are stored in a computer-readable medium, such as a non-transitory computer readable medium. The steps illustrated in FIG. 4 need not all be performed in the order specified, and some steps may be omitted or changed in order.

At step 410, a connection may be established with one or more services. The services may request to receive data sharing events. To request to receive the data sharing events, the services may provide addresses for transmitting the data sharing events. A database or list of subscribers to the data sharing events may be maintained. For example, services 340-42 may transmit messages to the data sharing worker service 310 requesting that the data sharing events be transmitted to services 340-42.

Although illustrated as the initial step in method 400, services may subscribe to or unsubscribe from the data sharing events at any time. If a data sharing event or a predetermined threshold number of data sharing events are transmitted to a service, but the transmission fails, that service may be removed from receiving further data sharing events. For example, if service 341 was subscribed to receive data sharing events, but a connection could no longer be established with service 341, then the service 341 may be removed from receiving further data sharing events. In this example, the data sharing worker service 310 may periodically attempt to reestablish the connection with the service 341, and if the connection is reestablished, then the data sharing worker service 310 may resume providing the service 341 with data sharing events.

At step 415, a data polling rate may be received or determined. The data polling rate may indicate a rate at which data can be retrieved from the shared data source. The data polling rate may indicate a maximum number of queries over a specified period of time, a maximum volume of data to retrieve in a specified amount of time, a maximum number of rows of data to retrieve in a specified amount of time, or any other rate for accessing data. The data polling rate may be preconfigured or preset.

The data polling rate may be determined based on a current performance of the shared data source. The data polling rate may be determined based on an amount of available memory, an indicator of CPU performance, an indicator of network usage, or any other data corresponding to the shared data source. The data polling rate may be adjusted based on the performance of the shared data source. The data polling rate may be adjusted at a set interval, such as every five minutes, or after a predetermined number of queries.

The data polling rate may be determined based on an amount of data in the shared data source and/or a desired cycle length. For example, the data polling rate may be determined so that all data in the shared data source is traversed once per day.

At step 420, a data transmission rate may be received or determined. The data transmission rate may indicate a rate at which data sharing events are to be transmitted to subscribed services. The transmission rate may indicate a maximum rate, minimum rate, targeted average rate, a range of acceptable rates, or any other measure for transmitting data. The data transmission rate may be altered at any time during the method 400. The data transmission rate may be adjusted based on a performance measurement, such as a performance measurement of the shared data source. The data transmission rate may indicate a maximum amount of data to be transmitted in a predetermined time period. For example, the data transmission rate may indicate that a maximum of five rows of data may be transmitted each second. The data transmission rate may indicate a delay between data sharing events. For example, the data transmission rate may indicate that a delay of two seconds should occur between each data sharing event. The data transmission rate may indicate an amount of data to be transmitted in each data sharing event. For example, the data transmission rate may indicate that ten rows of data should be transmitted in each data sharing event, or that a maximum of one megabyte of data should be transmitted in each data sharing event. The data transmission rate may be determined based on an amount of data in the shared data source and/or a desired cycle length.

At step 430, a data sharing event may be transmitted, where the data sharing event comprises a first segment of data retrieved from the shared data source. The first segment of data may comprise a first row of a database or a table. The method 400 may iteratively traverse the shared data source, and may use any method for iterating through the shared data source. For example, the first segment of data may comprise the oldest data or the newest data in the shared data source. The shared data source may be iterated through in a random fashion, or using any other appropriate algorithm for iterating through a set of data. For example, if the shared data comprises a plurality of book titles, the book titles may be sorted in alphabetical order and traversed in that order.

At step 440, the method 400 may wait for the next transmission time. For example, if the data transmission rate indicates that two seconds should pass between data sharing events, then the method 400 may wait two seconds at step 440. If the data transmission rate indicates a maximum amount of data to be transmitted over a period of time, the method 400 may determine, at step 440, whether to continue or delay in order to satisfy the transmission rate. After waiting for the amount of time dictated by the data transmission rate, the method 400 may proceed to step 450. The method 400 may also wait at step 440 based on the data polling rate.

At step 450 the next segment of data from the shared data source may be transmitted in a data sharing event. For example, if the data transmission rate received at step 420 indicates that 25 rows of data should be transmitted in each data sharing event, then the next 25 rows of data may be transmitted at step 450.

At step 460, the shared data source may be examined to determine whether all data has been sent. If the shared data source is a database that is being transmitted in order from the first to last row, step 460 may determine whether the last row has been reached. If the last row has been reached, the method may wait for the next transmission time at step 470, and then transmit the first segment of data at step 430. The method 400 may continuously transmit data from the shared data source 320, repeating at the beginning of the shared data source 320 after all data has been transmitted via data sharing events. Regardless of when a new service subscribes to the data sharing events, the new service may receive all data in the shared data source 320 via data sharing events. The data transmission rate may control how quickly the new service will receive the entire set of data in the shared data source 320.

If, at step 460, all data has not yet been sent, the method may proceed to step 440 to wait for the next transmission time, and then send the next segment of data in a data sharing event at step 450. The method 400 may continue iterating through the shared data source indefinitely in this manner, returning to the beginning of the shared data source each time a cycle is complete.

Figure 5:
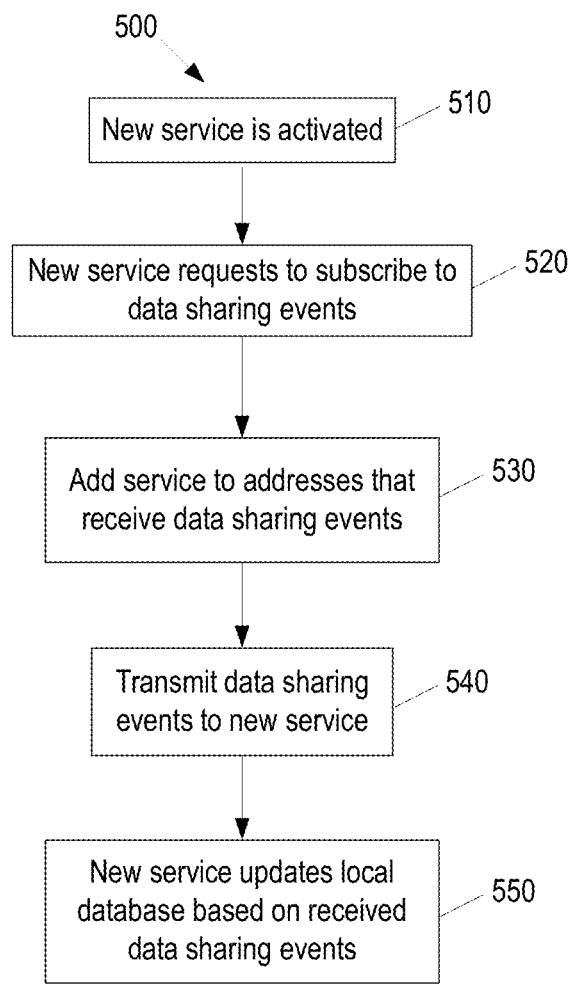
FIG. 5 is a flow diagram of a method for adding a service to a data sharing system according to one or more illustrative aspects of the disclosure.

FIG. 5 is a flow diagram of a method 500 for adding a service to a data sharing system according to one or more illustrative aspects of the disclosure. In one or more embodiments, one or more steps illustrated in FIG. 5 may be performed by one or more computing devices or entities. For example, portions of the steps illustrated in FIG. 5 may be performed by one or more computing devices, such as data server 103, web server 105, client computer 107, client computer 109, or by one or more elements of the cloud computing environment 200. The steps illustrated in FIG. 5 may be embodied in computer-executable instructions that are stored in a computer-readable medium, such as a non-transitory computer readable medium. The steps illustrated in FIG. 5 need not all be performed in the order specified, and some steps may be omitted or changed in order.

At step 510 a new service may be activated. The new service may comprise an update to a previously operating service. The new service may be a cloud service. The new service may comprise any type of software service, such as an email client or a file sharing service. Although described as a new service, the service may be any service that was not previously subscribed to data sharing events.

At step 520, the new service may request to subscribe to data sharing events. The new service may transmit an address corresponding to the new service. The new service may use an API to request to subscribe to the data sharing events. An administrator of the data sharing service may manually add the new service to the list of subscribed services. The administrator of the data sharing service may authorize the new service to receive data sharing events.

At step 530 the new service may be subscribed to the data sharing events. For example, an address corresponding to the new service may be added to a list or database used to maintain addresses to transmit data sharing events to.

At step 540 data sharing events may be transmitted to all subscribed services, including the new service. Each data sharing event may be transmitted simultaneously, or approximately simultaneously, to each of the subscribed services.

At step 550 the new service may receive a data sharing event and respond to the data sharing event. Each service may be configured to operate differently upon receiving a data sharing event. The service may use data in the data sharing event to update its local data, to retrieve other data from an external database, to perform calculations, and/or for other purposes.

Figure 6:
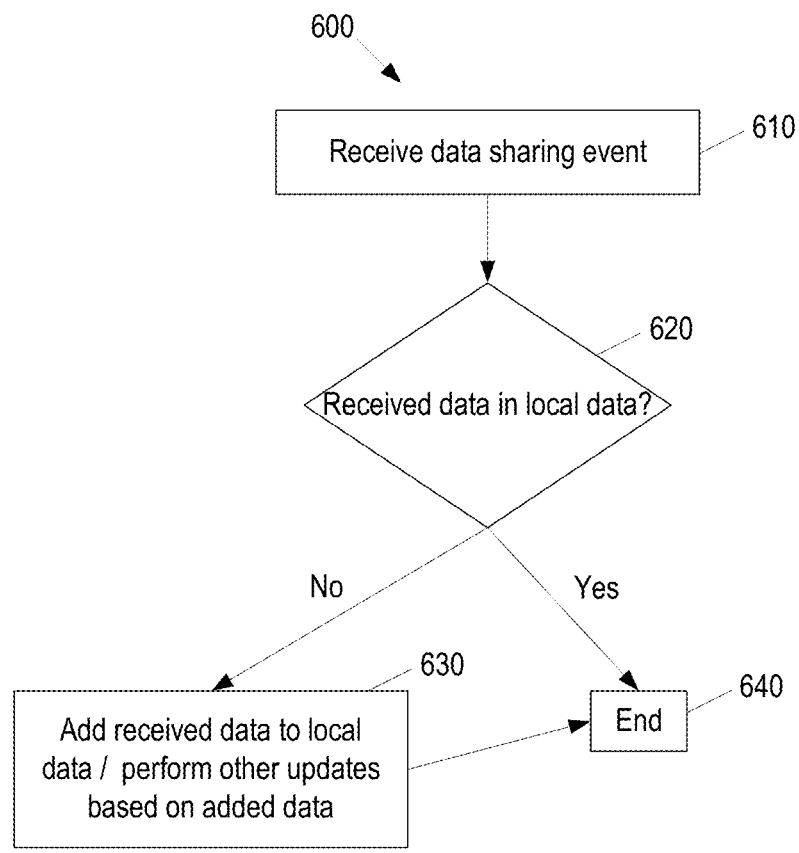
FIG. 6 is a flow diagram of a method for receiving data sharing events according to one or more illustrative aspects of the disclosure.

FIG. 6 is a flow diagram of a method 600 for receiving data sharing events according to one or more illustrative aspects of the disclosure. In one or more embodiments, one or more steps illustrated in FIG. 6 may be performed by one or more computing devices or entities. For example, portions of the steps illustrated in FIG. 6 may be performed by one or more computing devices, such as data server 103, web server 105, client computer 107, client computer 109, or by one or more elements of the cloud computing environment 200. The steps illustrated in FIG. 6 may be embodied in computer-executable instructions that are stored in a computer-readable medium, such as a non-transitory computer readable medium. The steps illustrated in FIG. 6 need not all be performed in the order specified, and some steps may be omitted or changed in order.

At step 610, a service may receive a data sharing event. As described above, the data sharing event may comprise a portion of data from a shared data source. For example, the data sharing event may comprise one or more usernames. The data sharing event may comprise one or more rows of data in a database. For example, the data sharing event may comprise a row of user data having a username, an email address, and an indication of services that the user is subscribed to. In another example, the data sharing event may comprise a row of data on a product, which may comprise a product name, a stock keeping unit (SKU), and a price.

At step 620, the service may determine whether the received data was previously received by the service. The service may determine whether the received data, or an indication of the received data, is stored in the local data corresponding to the service. For example, if the received data comprises a user ID, the service may determine whether user data corresponding to the user ID is stored in the local data. The service may determine, at step 620, whether the received data comprises an update or modification to data stored in the local data.

If the data was not found in the local data, or if the data comprises an update or modification to the local data, the method 600 may proceed to step 630. Otherwise, the method 600 may end at step 640. At step 630, the service may add the received data to the local data, update the local data based on the received data, and/or perform other operations using the received data at step 640. The service may access the shared data source to retrieve additional data corresponding to the data sharing event. For example, if the data sharing event comprises a user ID, the service may access the shared data source to retrieve an email address or other data corresponding to the user ID. The method 600 may then end at step 650, until another data sharing event is received. The service may continue receiving data sharing events and updating its local data, as the data sharing worker service iterates through the local data source.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   sending a request to subscribe to data sharing events of a shared data source, wherein the request corresponds to a service;
   receiving, in response to the request and at a time interval, each data sharing event of a plurality of data sharing events, wherein the time interval is determined based on a processor performance measurement of the shared data source;

retrieving, from a data sharing event of the plurality of data sharing events, an indication of a user;

storing the indication of the user in a local data source corresponding to the service;

retrieving, from a source external to the service, data corresponding to the user; and storing the data in the local data source.

2. The method of claim 1, wherein the indication of the user comprises a username.

3. The method of claim 1, wherein the local data source is a database maintained by the service.

4. The method of claim 1, wherein sending the request comprises sending, by the service and using an application programming interface (API), the request.

5. The method of claim 1, further comprising querying an external database for the data corresponding to the user.

6. The method of claim 1, wherein the time interval is determined further based on at least one of: processor usage, an amount of available memory, or network usage.

7. The method of claim 1, wherein the receiving the each data sharing event of the plurality of data sharing events is based on a polling rate indicating a maximum quantity of queries to the shared data source over a specified period of time.

8. One or more non-transitory computer readable storage media storing computer executable instructions that, when executed, configure a system to perform:

sending a request to subscribe to data sharing events of a shared data source, wherein the request corresponds to a service;

receiving, in response to the request and at a time interval, each data sharing event of a plurality of data sharing events, wherein the time interval is determined based on a processor performance measurement of the shared data source;

retrieving, from a data sharing event of the plurality of data sharing events, an indication of a user;

storing the indication of the user in a local data source corresponding to the service;

retrieving, from a source external to the service, data corresponding to the user; and storing the data in the local data source.

9. The one or more non-transitory computer readable storage media of claim 8, wherein the indication of the user comprises a username.

10. The one or more non-transitory computer readable storage media of claim 8, wherein the local data source is a database maintained by the service.

11. The one or more non-transitory computer readable storage media of claim 8, wherein sending the request comprises sending, by the service and using an application programming interface (API), the request.

12. The one or more non-transitory computer readable storage media of claim 8, further comprising querying an external database for the data corresponding to the user.

13. The one or more non-transitory computer readable storage media of claim 8, wherein the time interval is determined further based on at least one of: processor usage, an amount of available memory, or network usage.

14. The one or more non-transitory computer readable storage media of claim 8, wherein the instructions, when executed, configure the system to perform the receiving the each data sharing event of the plurality of data sharing events based on a polling rate that indicates a maximum quantity of queries to the shared data source over a specified period of time.

15. A system comprising:

a processor; and memory storing computer executable instructions that, when executed, configure the system to perform:

sending a request to subscribe to data sharing events of a shared data source, wherein the request corresponds to a service;

receiving, in response to the request and at a time interval, each data sharing event of a plurality of data sharing events, wherein the time interval is determined based on a processor performance measurement of the shared data source;

retrieving, from a data sharing event of the plurality of data sharing events, an indication of a user;

storing the indication of the user in a local data source corresponding to the service;

retrieving, from a source external to the service, data corresponding to the user; and storing the data in the local data source.

16. The system of claim 15, wherein the indication of the user comprises a username.

17. The system of claim 15, wherein the local data source is a database maintained by the service.

18. The system of claim 15, wherein sending the request comprises sending, by the service and using an application programming interface (API), the request.

19. The system of claim 15, further comprising querying an external database for the data corresponding to the user.

20. The system of claim 15, wherein the time interval is determined further based on at least one of: processor usage, an amount of available memory, or network usage.

* * * * *